United States Patent
Boggs et al.

[11] 3,994,064
[45] Nov. 30, 1976

[54] NOISE SUPPRESSING ASSEMBLY FOR CONTINUOUS TRACK OF CRAWLER TYPE VEHICLE

[75] Inventors: Roger L. Boggs, East Peoria; Eugene R. Groff, Chillicothe; Paul L. Wright, Peoria, all of Ill.

[73] Assignee: Caterpillar Tractor Co., Peoria, Ill.

[22] Filed: Oct. 14, 1975

[21] Appl. No.: 622,208

[52] U.S. Cl. .................................................. 305/57
[51] Int. Cl.² ......................................... B62D 55/08
[58] Field of Search ................ 305/57, 52; 74/229, 74/247, 245 R, 230.1, 245 S, 250 S, 255 S, 443

[56] References Cited
UNITED STATES PATENTS

| 2,444,088 | 6/1948 | Becker | 74/230.1 X |
| 3,887,244 | 6/1975 | Haslett et al. | 305/57 |

*Primary Examiner*—Robert B. Reeves
*Assistant Examiner*—John P. Shannon
*Attorney, Agent, or Firm*—Frank L. Hart

[57] ABSTRACT

A resilient contacting assembly attachable to track shoes of a crawler type vehicle. The contacting element is formed of a plurality of discs for improving the wear life of the contacting element.

9 Claims, 4 Drawing Figures

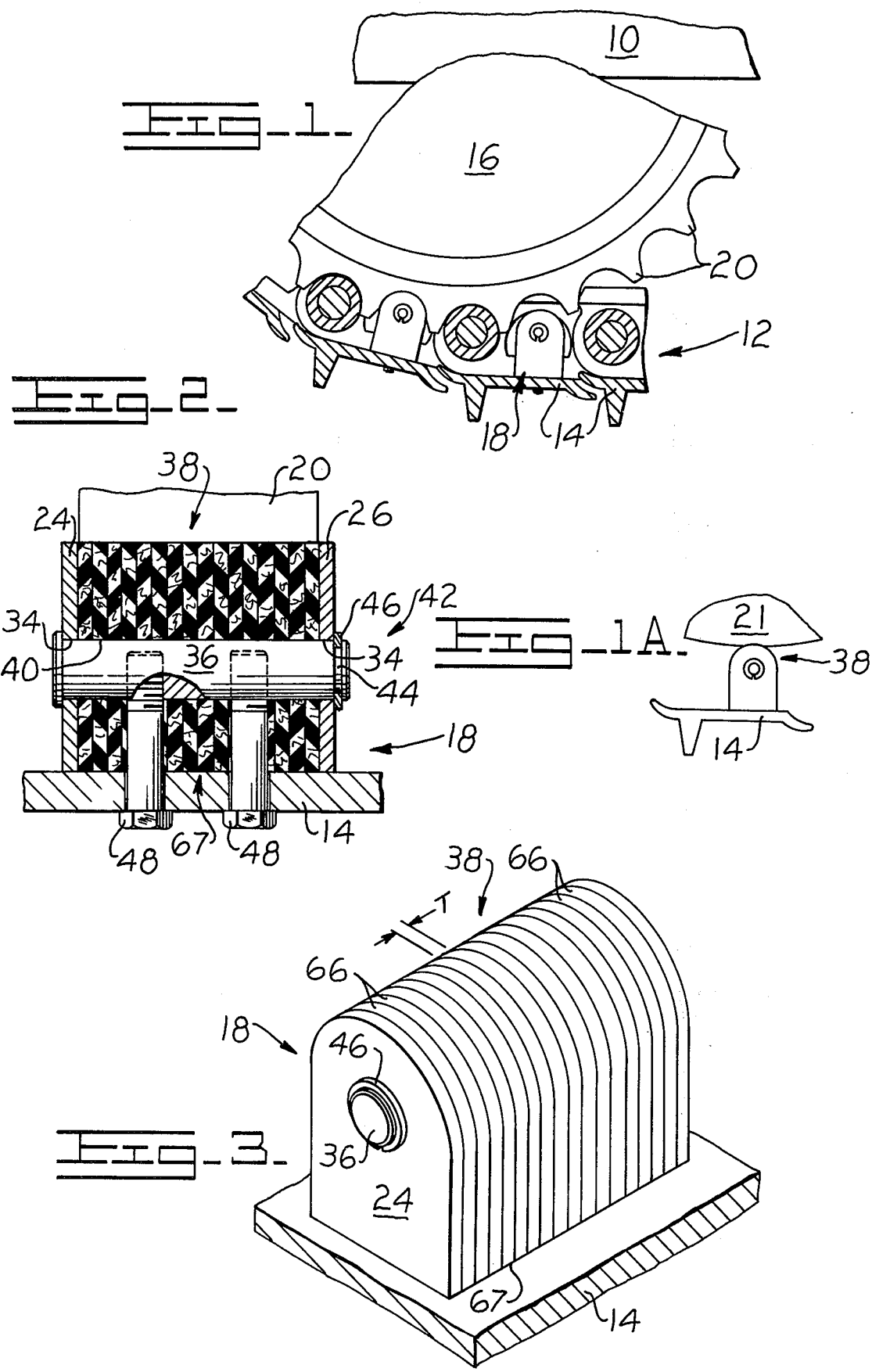

NOISE SUPPRESSING ASSEMBLY FOR CONTINUOUS TRACK OF CRAWLER TYPE VEHICLE

BACKGROUND OF THE INVENTION

Conventional continuous tracks for use with track type vehicles such as crawler tractors comprise a series of track links interconnected by pins fitted with an external bushing. In such a construction, the track links have an inner rail surface upon which the track rollers and idler wheels roll. The pin and bushing connections of these conventional prior art structures provide a drive means for coaction with a chain-driving sprocket whereby the track is forcibly driven by rotational movement of the sprocket.

Although such a track construction has gained wide acceptance, it is subject to several shortcomings, such as noise created by the bushings impacting upon the drive sprocket and the rail surfaces impacting on the idler. Such conventional structures are also subjected to a high rate of wear and power losses due to these impactions and due also to the scrubbing action of the bushings against the sprocket as the track is driven.

A recent development in the art of endless tracks for track type vehicles is the provision of a drive lug located on the track shoes intermediate the pin and bushing connections to assist the bushings in driving the track. Although these midpitch drive lugs have been somewhat effective in substantially eliminating a number of the disadvantages associated with conventional endless tracks, other disadvantages, such as high noise and wear levels, have not been satisfactorily overcome. Exemplary of prior art attempts to reduce noise, wear, and other shortcomings of endless track assemblies include U.S. Pat. No. 3,887,244 which issued to G. M. Haslett et al on June 3, 1975 from an application filed Nov. 30, 1973. Although the apparatus of that patent functioned satisfactorily for suppressing noise, its wear life was somewhat less than a desirable period of time.

This invention therefore resides in an apparatus for suppressing noise of a continuous track of a crawler type vehicle and which has an improved wear life.

BRIEF DESCRIPTION OF THE DRAWINGS

FIGS. 1 and 1A are diagrammatic views of a portion of the track and a crawler type vehicle having the apparatus of this invention;

FIG. 2 is a diagrammatic frontal view of the apparatus of this invention; and

FIG. 3 is a diagrammatic end view of the apparatus of FIG. 2.

DETAILED DESCRIPTION OF THE INVENTION

Referring to FIGS. 1 and 1A, a crawler type vehicle 10 has a continuous track 12 formed of a plurality of interconnected track shoes 14. The track 12 is driven by a sprocket wheel 16, as is known in the art.

The noise suppressing assembly 18 of this invention is connectable to a surface of a track shoe 14 for suppressing noise responsive to contact of the track 12 by the driving sprocket 16 and/or other wheels 21 of the vehicle 10. The noise suppressing assemblies 18 are positioned on the track shoes 14 and are of a size sufficient for contacting the track shoe 14 and contacting the sprocket 16 at locations between the sprocket teeth 20 during the operation of the vehicle 10.

Referring to FIGS. 2 and 3, the noise suppressing assembly 18 has first and second pressure plates 24, 26 each having an opening 34 for receiving an axle 36 of the assembly 18.

A resilient contacting element 38 is mounted about the axle 36. The contacting element 38 is of elongated configuration and has an opening 40 extending longitudinally therethrough for receiving the axle 36. The contacting element 38 has a length sufficient for spanning the thickness of the sprocket teeth 20 and the outside diameter is of a size sufficient for forcibly contacting the sprocket 16 and/or other wheels 21 (FIG. 1A) with an outer surface of the element 38.

Means 42 is provided for connecting the contacting element 38 to the shoe 14. This means 42 can be of various constructions. In the preferred embodiment shown, the axle 36 has an annular groove 44 formed on an end of the axle 36 for receiving a retaining ring 46. The first and second pressure plates 24, 26 are positioned about the axle 36 on opposed sides of the contacting element 38. Bolts 48 extend through the shoe 14, the contacting element 38, and into threadable engagement with the axle 36 for fixing the assembly 18 to the shoe 14 and controlling the engagement force of the element 38 against the shoe 14.

The contacting element 38 is formed of a plurality of discs 66 each having a planar base 67 for contacting the shoe 14 over a relatively large area and preventing rotation of the discs 66. The discs 66 are urged toward one another by the pressure plates 24, 26 for maintaining the discs 66 together and providing increased, controllable resistance to compression in response to contact along the outer surface. The discs 66 are axially compressed by the upright elements 24, 26 to preselected values that are dependent upon the resistive force desired.

The discs 66 are compressed to a value in the range of about 5% to about 30% of their original thickness T. An example original thickness is about 0.635 cm. The magnitude of resistance against the sprocket 16 sufficient for suppressidng noise can easily be determined by operating the vehicle and continuing to axially compress the discs 66 until a preselected magnitude of axial compression is obtained which will desirably suppress the noise. This can be done by providing an axle 36 which is threaded and has a nut on one end for increasing the axial forces. Once the desired axial compression is determined, subsequent axles can be manufactured with a groove 44 positioned at the desired location of the pressure plates 24, 26 for providing this axial compression.

Axial compression values less than about 5% are undesirable because the resultant discs 66 would have an undesirable resistance to wear and cutting, and axial compression values greater than about 30% are undesirable because the discs 66 would be undesirably deformed and the pressure plates 24, 26 would be undesirably massive which would result in waste.

The discs 66 are formed of rubber which provides the resilience necessary for the discs 66 to return to their original configuration after impact by the sprocket 16. Preferably, the rubber of the discs 66 is strengthened by fibers or woven material for increasing the wear life of the discs 66.

Examples of the types of rubber that are useful in this invention are found in U.S. Pat. No. 3,606,921 which issued to Charles E. Grawey on Sept. 21, 1971 from an application filed June 23, 1969, which is incorporated by reference. Example fibers that can be used are cotton, rayon, nylon, fiberglass, and steel which are bonded with the rubber. It should be understood, however, that other resilient materials and strengthening fibers can be used without departing from this invention.

In the operation of the apparatus, the separate discs 66 are deformed relative one to the other in response to different contacting forces, thereby preventing rocks or other objects between the sprocket and/or other wheels and the contacting element from gouging out portions of the contacting element thereby reducing wear and resultant waste. The disc construction of the contacting element also provides control for imparting preselected noise restraining resistance forces against the sprocket and the shoe.

Other aspects, objects, and advantages of this invention can be obtained from a study of the drawing, the disclosure, and appended claims.

What is claimed is:

1. In a noise suppressing assembly connectable to a track shoe of a continuous track of a crawler type vehicle having a sprocket and other track wheels associated with the track, said assembly having a resilient contacting element, and means for connecting the contacting element to the shoe, the improvement comprising:

said contacting element having a plurality of resilient, axially compressed discs with said axially compressed discs being of a size sufficient for contacting one of a sprocket and other track wheel with an outer surface of the discs and adjacent structure on an opposed outer surface of the discs in the installed position on a track shoe; and means for axially compressing the discs a value in the range of about 5% to about 30% of the thickness of the discs in a condition free of axial compression and wherein the discs in the compressed condition have a generally smooth outer surface.

2. Apparatus, as set forth in claim 1, wherein the resilient material of the discs is rubber.

3. Apparatus, as set forth in claim 2, wherein the rubber discs have fibers bonded within the rubber.

4. Apparatus, as set forth in claim 1, wherein the resilient discs have fibers of different material therein.

5. Apparatus, as set forth in claim 1, wherein the discs have an opening and including an axle extending therethrough; and first and second pressure plates extending about the axle on opposed ends of the contacting element.

6. Apparatus, as set forth in claim 1, wherein the discs have a generally planar base and an opposed contacting surface of arcuate configuration, said planar base being in contact with the shoe in the installed position thereon.

7. Apparatus, as set forth in claim 6, including a threaded member passing through the shoe, the contacting element, and into engagement with the axle for controllably forcing the disc bases into contact with the shoe.

8. Apparatus, as set forth in claim 1, including:

an axle having a middle portion and extending generally axially through the plurality of discs; and a pair of spaced apart bolts extendable through a respective shoe and into threaded engagement with the middle portion of the axle for connecting the discs to the shoe.

9. Apparatus, as set forth in claim 8, including:

first and second pressure plates each having a planar base contacting the shoe, said plates extending about the axle on opposed ends of the contacting element.

* * * * *